(12) United States Patent
Chow et al.

(10) Patent No.: US 7,920,270 B2
(45) Date of Patent: Apr. 5, 2011

(54) APPARATUS FOR INTERFEROMETRIC SENSING

(75) Inventors: Jong H. Chow, Acton (AU); Malcolm B. Gray, Pennant Hills (AU); David E. McClelland, O'Connor (AU)

(73) Assignee: The Australian National University (AU)

( * ) Notice: Subject to any disclaimer, the term of this patent is extended or adjusted under 35 U.S.C. 154(b) by 41 days.

(21) Appl. No.: 12/083,869

(22) PCT Filed: Oct. 18, 2006

(86) PCT No.: PCT/AU2006/001541
§ 371 (c)(1),
(2), (4) Date: Dec. 4, 2008

(87) PCT Pub. No.: WO2007/045028
PCT Pub. Date: Apr. 26, 2007

(65) Prior Publication Data
US 2009/0091765 A1   Apr. 9, 2009

(30) Foreign Application Priority Data
Oct. 18, 2005   (AU) .............................. 2005225034

(51) Int. Cl.
*G01B 9/02*   (2006.01)
(52) U.S. Cl. ...................................................... 356/478
(58) Field of Classification Search ................... 356/478
See application file for complete search history.

(56) References Cited

U.S. PATENT DOCUMENTS

| | | | |
|---|---|---|---|
| 4,360,272 A * | 11/1982 | Schmadel et al. ............ | 356/478 |
| 5,675,674 A | 10/1997 | Weis | |
| 5,748,312 A | 5/1998 | Kersey et al. | |
| 5,991,026 A * | 11/1999 | Kluth et al. ................... | 356/478 |
| 6,417,507 B1 | 7/2002 | Malvern et al. | |
| 2001/0013934 A1 | 8/2001 | Varnham et al. | |

FOREIGN PATENT DOCUMENTS

GB   2 340 227 A   2/2000

OTHER PUBLICATIONS

Gagliardi, G., et al., "Fiber Bragg-Grating Strain Sensor Interrogation Using Laser Radio-Frequency Modulation," *Optics Express*, 13(7):2377-2384 (Apr. 4, 2005).

Koo, K. P. and Kersey, A. D., "Bragg Grating-Based Laser Sensors Systems with Interferometric Interrogation and Wavelength Division Multiplexing," *J. of Lightwave Technol.*, 13(7):12434-1249 (Jul. 1995).

* cited by examiner

*Primary Examiner* — Tarifur Chowdhury
*Assistant Examiner* — Jonathon D Cook
(74) *Attorney, Agent, or Firm* — Hamilton, Brook, Smith & Reynolds, P.C.

(57) ABSTRACT

An apparatus for interferometric sensing, comprising a plurality of single-longitudinal mode laser sources to each provide radiation at a corresponding plurality of selected wavelengths, and at least one modulator to frequency or phase modulate the radiation from each laser; a plurality of Fabry-Perot interferometers formed by Bragg Gratings written into optical fibre, each interferometer being responsive to one of the said plurality of wavelengths to each produce a reflected or transmitted optical output signal dependent on the corresponding interferometer path length; and one or more demodulators to demodulate the optical output signals and produce a corresponding plurality of measurement signals indicative of optical path lengths of the respective interferometers.

14 Claims, 19 Drawing Sheets

(a)

(b)

APPARATUS FOR INTEROFEROMETRIC SENSING

RELATED APPLICATIONS

This application is the U.S. National Stage of International Application No. PCT/AU2006/001541, filed Oct. 18, 2006, published in English, and claims priority under 35 U.S.C. §119 or 365 to Australian Application No. 2005225034, filed Oct. 18, 2005.

The present invention relates to an apparatus for interferometric sensing.

BACKGROUND

There is a demand in many industries to improve the sensitivity of passive sensors that provide real-time information about their environment such as those measuring stress and strain, which can be induced by movement in structures, pressure change and temperature change. The traditional method for sensing strain has relied on piezoelectric strain gauges, which generate a voltage indicative of applied strain. However, large-scale piezoelectric-based systems suffer from a number of problems, including the cost of the piezoelectric sensors, the size of the sensors, the signal attenuation over long cables, spurious signals caused by electromagnetic interference, and the expense of high-speed electric cabling to connect sensors in larger arrays. A number of the problems of the piezoelectric-based methods can be overcome by using techniques based on optical equipment. For example, sensors can be connected with optical fibre, which has a far greater bandwidth than electric cabling and is immune to electromagnetic interference. Optical systems can be constructed of inexpensive, commoditised telecommunications equipment. Strain measurements can be made in optical systems using relatively inexpensive Fibre Bragg Gratings.

Fibre Bragg Gratings are created by burning (ie writing) a periodic pattern along a segment of optical fibre using high-intensity ultraviolet light; the pattern consists of alternative lines of high and low refractive index, which is a Bragg grating. A Bragg grating is a highly colour-selective mirror: light passing through the periodic structure is either transmitted or reflected depending on its wavelength. The wavelengths that are reflected can be chosen in the design of the grating: for example, the extent to which light of one wavelength (or colour) is reflected depends on the spacing of the lines that make up the grating.

A Fibre Bragg Grating can be used as a sensor because the line spacing, and thus the amount of reflected light at one selected wavelength, changes with the optical length of the fibre, which in turn changes with mechanical strain or temperature.

Fibre Bragg Gratings have been proposed as ultra-sensitive static and dynamic strain detectors for a variety of applications, such as underwater acoustic array sensors, embedded monitoring of smart structures in civil and aerospace industries, ultrasonic hydrophones for medical sensing, submarine surveillance and seismic sensors for geophysical surveys. The benefits over the piezoelectric strain sensors include their smaller cross-sectional area, their scalability to large arrays, and their suitability for electromagnetic interference-sensitive and hazardous environmental applications. In addition, optical sensor arrays can be remotely interrogated and optically multiplexed using standard, commoditised, telecommunications equipment. Early demonstrations were based on changes in the gross Bragg wavelength, as the gratings were perturbed by strain and temperature. As interrogation techniques became more sophisticated, various signal processing and active fringe side locking schemes were employed, which dramatically improved the resolution of these sensing schemes.

United States patent application number 2001/0013934 discloses an interferometric sensing device using a broadband switched optical source and sensing interferometers which can be formed in optical fibre Bragg Gratings. A matched interferometer contains a phase modulator and the sensing interferometers have an optical path difference approximately equal to the optical path difference in the matched interferometer. An optical interference signal at a different wavelength is returned to a detector by each of the sensing interferometers. Each interference signal is representative of the difference between the optical path length of the sensing interferometer and that of the matched interferometer and this can be used as a measurement signal. This approach is limited by a number of difficulties, including: (i) achieving accurate control of the path length difference between the sensing and reference interferometer; (ii) reducing acoustic noise arising from the reference interferometer; and (iii) improving the limited strain resolution and dynamic range arising from the use of white light.

Another approach is described by G. Gagliardi et al in Optics Express, Volume 13, No. 7 where radio-frequency modulation techniques are used to interrogate Fibre Bragg Grating structures. Strain measurements are made by obtaining a measure of the changes in Bragg wavelength from laser radiation reflected by the grating. This approach is limited by a number of difficulties, including: (i) the radio-frequency modulation needs to be very high compared to the sensitive bandwidth of the Fibre Bragg Grating; and (ii) the achievable sensitivity is poor as the frequency discrimination and strain discrimination of the error signal is limited by the sensitive bandwidth of the Fibre Bragg Grating.

SUMMARY

Accordingly one aspect of present invention provides an apparatus for interferometric sensing, comprising a plurality of single-longitudinal mode laser sources to each provide radiation at a corresponding plurality of selected wavelengths, and at least one modulator to frequency or phase modulate the radiation from each laser; a plurality of Fabry-Perot interferometers formed by Bragg Gratings written into optical fibre, each interferometer being responsive to the modulated radiation at one of the said plurality of wavelengths to each produce a reflected or transmitted optical output signal dependent on the corresponding interferometer path length; and one or more demodulators to demodulate the optical output signals and produce a corresponding plurality of measurement signals indicative of optical path lengths of the respective interferometers.

DESCRIPTION OF THE DRAWINGS

Embodiments of the invention will now be described solely by way of example and with reference to the accompanying drawings in which.

DETAILED DESCRIPTION OF PREFERRED EMBODIMENTS

Figure 1:
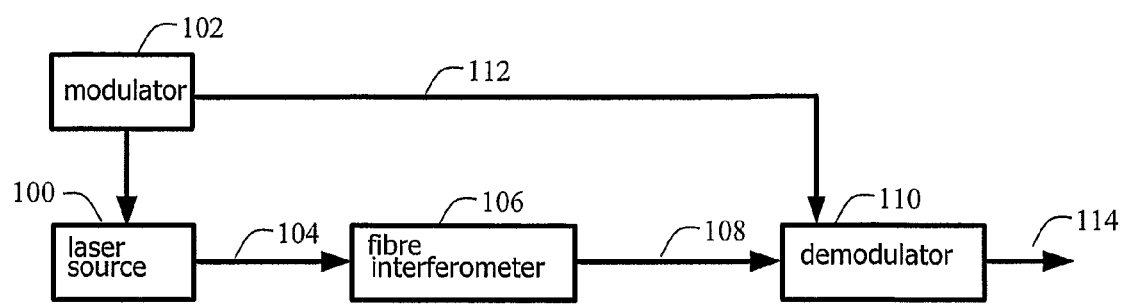
FIG. 1 is a schematic drawing of the general arrangement of an interferometric sensor.

A laser source 100, as shown in FIG. 1, comprises a laser with a single longitudinal mode at a central wavelength that can be selected. A modulator 102 modulates the selected wavelength radiation from the laser in frequency or phase, which results in a 'frequency-modulated' (FM) output 104. The FM light beam (ie modulated radiation) is transmitted to a Fibre Bragg Grating Fabry-Perot Interferometer (FFP) 106. The central wavelength of the laser source 100 is chosen to correspond to or fall within the resonance wavelength of the interferometer 106. This may be achieved by tuning the central wavelength of laser source or by tuning the fibre interferometer. The interferometer may be tuned through a number of mechanisms, including stress tuning, strain tuning and temperature tuning. Tuning mechanisms for the laser are described below.

Fibre Bragg Grating Fabry-Perot Interferometers effectively multiply the phase change in a single Fibre Bragg Grating due to fibre optical path displacements. With careful control of the grating writing process and appropriate choice of glass material, a Fibre Bragg Grating Fabry-Perot Interferometer (FFP) can have a finesse of well over 1000 and a linewidth of a few MHz.

The modulated laser beam 104 is either reflected from or transmitted through the fibre interferometer 106 to produce an optical output signal. The optical output signal contains an optical output signal 108 that transmits information about the optical length of the interferometer 106. The optical output signal 108 is detected by a demodulator 110, which is synchronised with the modulator 102 through a modulation signal 112, and a measurement signal 114 is produced after demodulation that depends on the optical length of the interferometer 106.

The fibre interferometer 106 may have a number of compelling systemic advantages for strain sensing. The sensor may be relatively inexpensive because it can use SMF-28 optical fibre which has a low loss of 0.3 dB/km. The sensor requires only low laser power at the microwatt level, and is immune to noise from many, otherwise limiting sources such as laser intensity noise and remote streamer fibre phase noise. The sensor is also readily scalable to large, all-optical arrays as described hereinafter.

Figure 2:
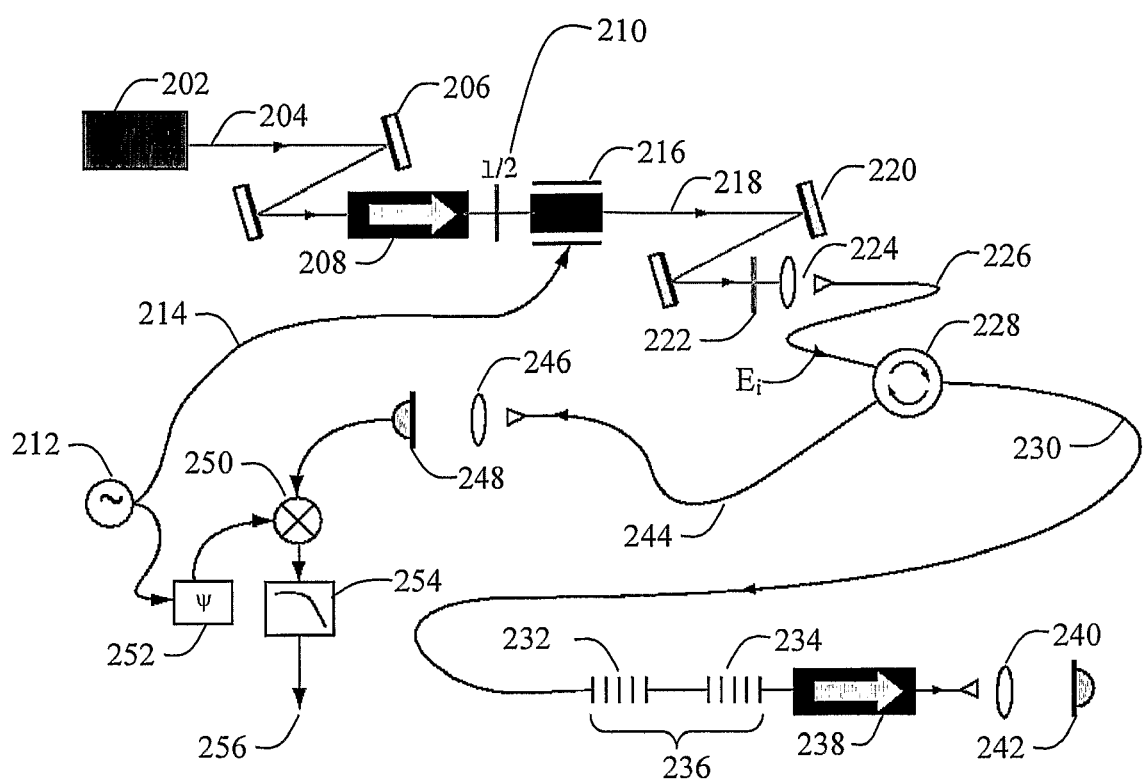
FIG. 2 is a schematic drawing of an experimental implementation of an apparatus for interferometric sensing.

In an experimental realisation of the apparatus for interferometric sensing, shown in FIG. 2, the laser 202 generates a beam 204 that is directed via mirrors 206 to an isolator 208, used to block optical reflections that might otherwise propagate back into the laser. A half-wave plate 210 is used to adjust the polarisation of the beam before the beam is frequency-modulated using an external phase modulator 216. The phase modulator is driven by signal generator 212. The modulated beam 218 is directed via mirrors 220 to a second half-wave-plate 222 and lens 224, which focuses the beam into a length of optical fibre 226. The incident beam Ei travels via an optical circulator 228 and a second length of fibre 230 to a Fibre Bragg Grating Fabry-Perot Interferometer 236 formed from two Fibre Bragg Gratings 232 and 234.

A portion Er of the incident beam Ei is reflected by the interferometer 236; this portion Er is reflected back along the fibre 230 via the circulator 228 to a third length of fibre 244, which delivers the reflected beam, via focussing lens 246, to an optical detector 248. The reflected portion E, and thus the signal detected by the reflection photodetector 248, depends on the reflective properties of the interferometer 236, which in turn depend on the optical length of the interferometer. The signal detected by the reflection photodetector 248 is mixed down with a mixer 250 to provide a measurement signal, or error signal, 256, which is indicative of the optical length of the interferometer. The mixer 250 uses a demodulation signal that has a fixed phase relationship, set by phase shifter 252, to the signal generator 212. A low-pass filter 254 may be used optionally to filter high-frequency noise from the error signal.

Another portion of the incident beam is transmitted by the interferometer, through a second isolator 238 and focussing lens 240, to a transmission photodetector 242. In a manner similar to the signal from the reflection photodetector 248, the signal from the transmission photodetector 242 is mixed with a constant-phase signal from the signal generator 212, delivering an error signal that indicates the optical length of the interferometer 236.

Figure 3:
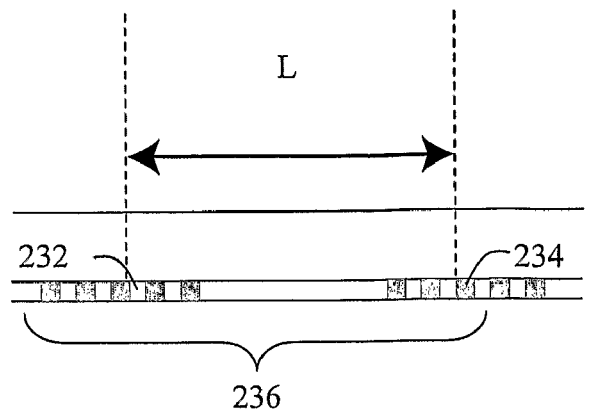
FIG. 3a is a schematic drawing of the tuning of a Fibre Bragg Grating Fabry-Perot Interferometer.
FIG. 3b is a schematic drawing of an example ultraviolet exposure profile used to write a Fibre Bragg Grating Fabry-Perot Interferometer (FFP).
Figure 3:
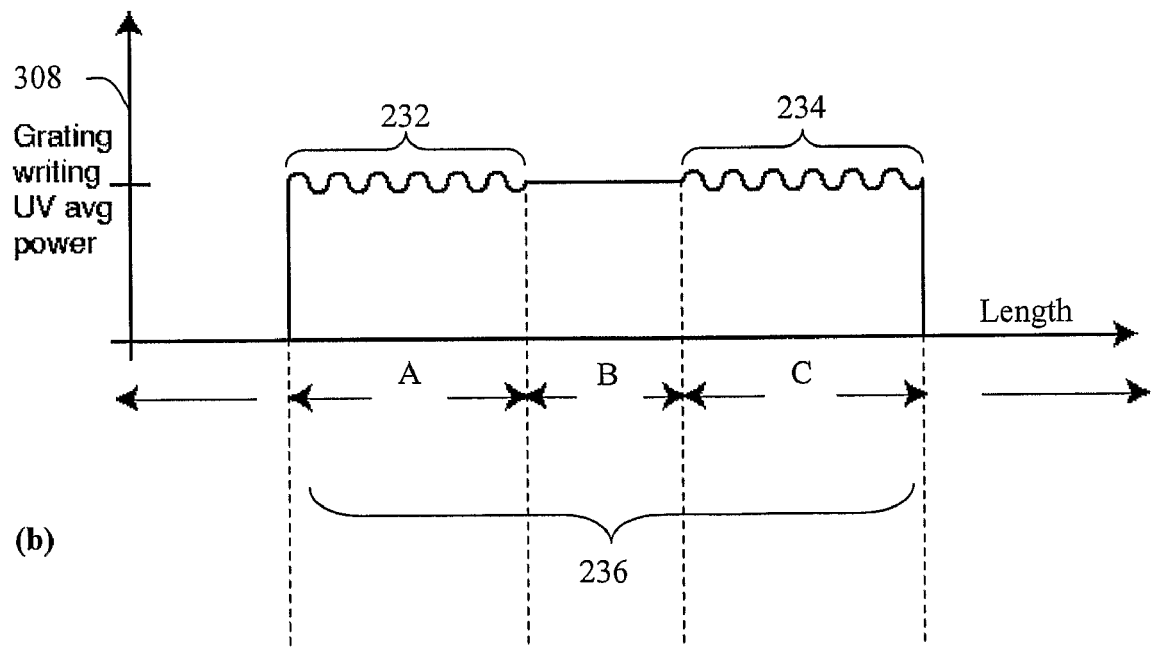

In the apparatus of FIG. 2, the laser 202 may be an external-cavity diode laser with a factory-estimated linewidth of 1 MHz, and an intrinsic linewidth of approximately 300 kHz, for example a New Focus Vortex 6029. The optical wavelength of the laser may be centred at approximately 1550.15 nm, with a tuning range of approximately 0.40 nm. The central selected wavelength of the laser 202 may be tuned by applying a voltage to a piezoelectric transducer (PZT) in the laser itself, thereby changing the laser cavity length. For example, the factory calibration of a New Focus Vortex 6029 specifies that the piezoelectric actuator has a gain of 12.5 GHz/V, thus a tuning range of approximately 0.40 nm corresponds to a frequency range of approximately 50 GHz. After passing through the optical isolator 208, the laser polarisation may be adjusted to vertical by the half-wave plate 210 before being modulated at 15 MHz by the resonant phase modulator 216, for example a New Focus 4003. The phase modulator 216 may be driven by a radio frequency (RF) signal generator 212, which may also provide the local oscillator signal for the demodulation electronics, as discussed above: The modulated laser beam 218 may be coupled with an aspheric lens 224 into a fibre-pigtailed polarisation-independent optical circulator 228, spliced to a Fibre Bragg Grating Fabry-Perot Interferometer (FFP) 236. To test the functionality of the system, the FFP may be held between a pair of magnetic clamps (not shown), with one of the clamps in turn mounted on a translation stage, thus enabling the Bragg wavelength to be stretch-tuned to within the wavelength range of the laser. FIG. 3a schematically shows the tuning of the FFP 236. A grating separation L is defined as the single pass effective optical path length between the Bragg Grating mirrors 232, 234. The resonance frequency of the FFP can be tuned by either increasing or decreasing L, where an increase in L decreases the resonance centre frequency, while a decrease in L increases the resonance centre frequency. This tuning can be effected in a number of ways, including stretching, heating, cooling and compressing the FFP inside a length of tubing by compressing the tubing.

A Fibre Bragg Grating Fabry-Perot Interferometer may be formed by a pair of nominally matched 13.5 dB Bragg gratings (R approximately 95.5%), each 15 mm long, spaced 10 mm apart, fabricated in a single phase-coherent writing process. An example ultraviolet exposure profile along the length of the fibre is illustrated in FIG. 3b, where A is 13 mm, B is 10 mm and C is 15 mm. Other ultraviolet exposure profiles may be used to write the FFP as known to those skilled in the art. The Bragg gratings may be written in hydrogenated SMF-28 fibre with no apodisation.

With reference to FIG. 2, both the transmitted Et and reflected Er signals may be collimated back into free space with aspheric lenses and then focussed onto photodetectors 242 and 248, respectively, each with electronic bandwidth of approximately 20 MHz. The optical isolator 238 in the transmitted port may be used to eliminate any parasitic etalon effects due to residual back reflections from the collimating asphere. The radio-frequency local oscillator (ie the signal generator 212) may be phase shifted via phase shifter 252 before being used to mix down the electronic signal from the reflected port.

The local oscillator phase shifter 252 may be optimised experimentally by maximising the error signal, thus providing a maximum signal-to-noise ratio for the system. Alternatively, dual-channel in-phase and quadrature detectors may be used to automatically optimise the phase. The optimum phase concerns the radio-frequency local oscillator phase that goes into the mixer in order to generate the error signal. There are two mechanisms that can generate an error signal depending on the ratio of the modulator frequency ($v_m$) to the fall-width half-maximum bandwidth ($\Delta v_{0.5}$) of the Fibre Bragg Grating Fabry-Perot Interferometer. For low frequency $v_m$ compared to $\Delta v_{0.5}$, the dominant mechanism is the relative change in one sideband with respect to the other sideband. For high frequency $v_m$ (ie $v_m \gg \Delta v_{0.5}$), the dominant mechanism is the phase rotation of the carrier with respect to both sidebands. The first mechanism requires a demodulation phase (local oscillator phase) 90 degrees away from the second-mechanism.

The polarisation dependence of the Fibre Bragg Grating Fabry-Perot Interferometer may be tested with a half-wave plate 222 before the laser is coupled into the fibre. In one experimental example, no visible shifts in resonance frequencies were observed as the waveplate was rotated; this implies that for practical purposes, the ultraviolet illumination of the grating core during the fabrication process can be regarded as isotropic. Any non-degeneracy due to parasitic birefringence would be beyond the linewidth resolution of the Fibre Bragg Grating Fabry-Perot Interferometer resonance, as the two modes provided well-behaved error signals free from input polarisation wander effects.

Figure 4:
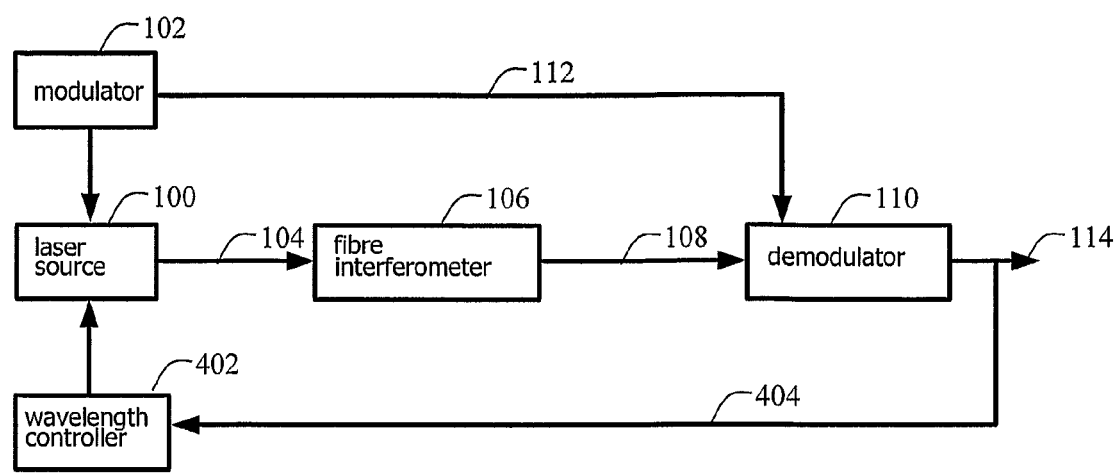
FIG. 4 is a schematic drawing of an experimental implementation of the apparatus for interferometric sensing.

An alternative apparatus for interferometric sensing, shown in FIG. 4, differs from the apparatus described above in that a wavelength controller 402 controls the central wavelength of the laser output, and this wavelength controller is controlled in turn by feedback 404 from the demodulator 110.

The central wavelength of the laser source 100 may be controlled by changing the length of the laser cavity, by frequency-locking the laser to an external length-controlled cavity, by modulating the drive current of a laser diode, or by other means known to those skilled in the art.

Figure 5:
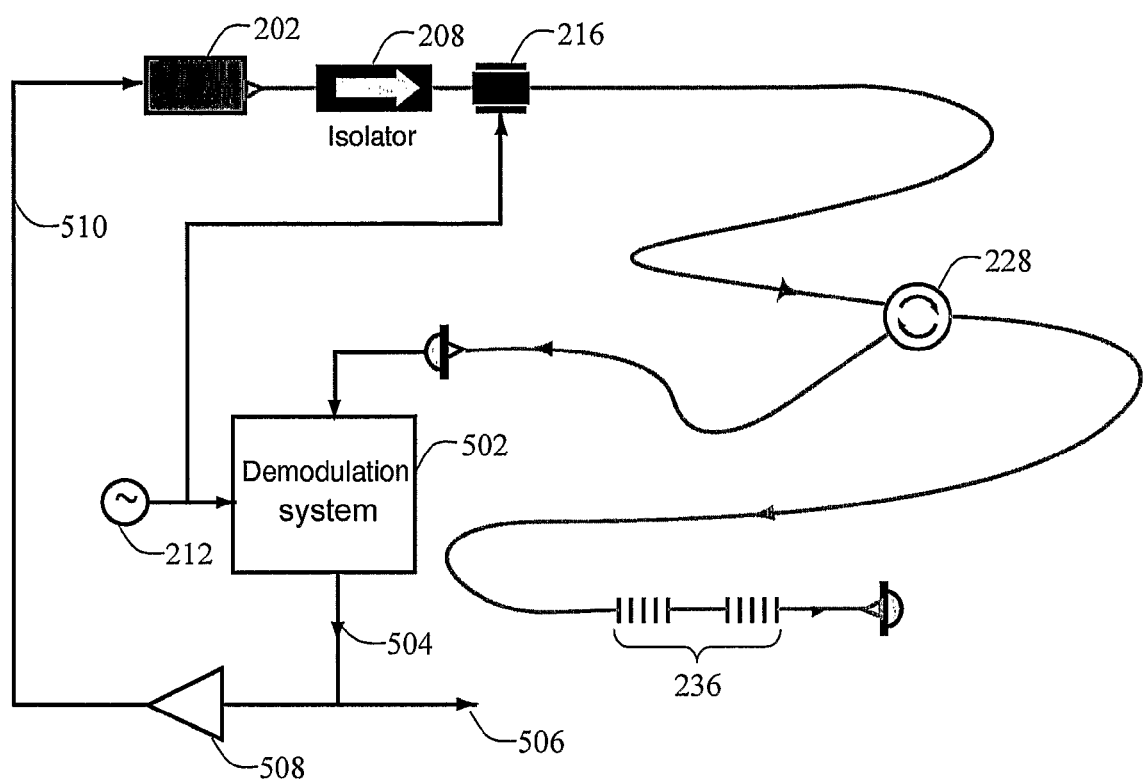
FIG. 5 is a schematic drawing of a further experimental implementation of the apparatus for interferometric sensing.
Figure 6:
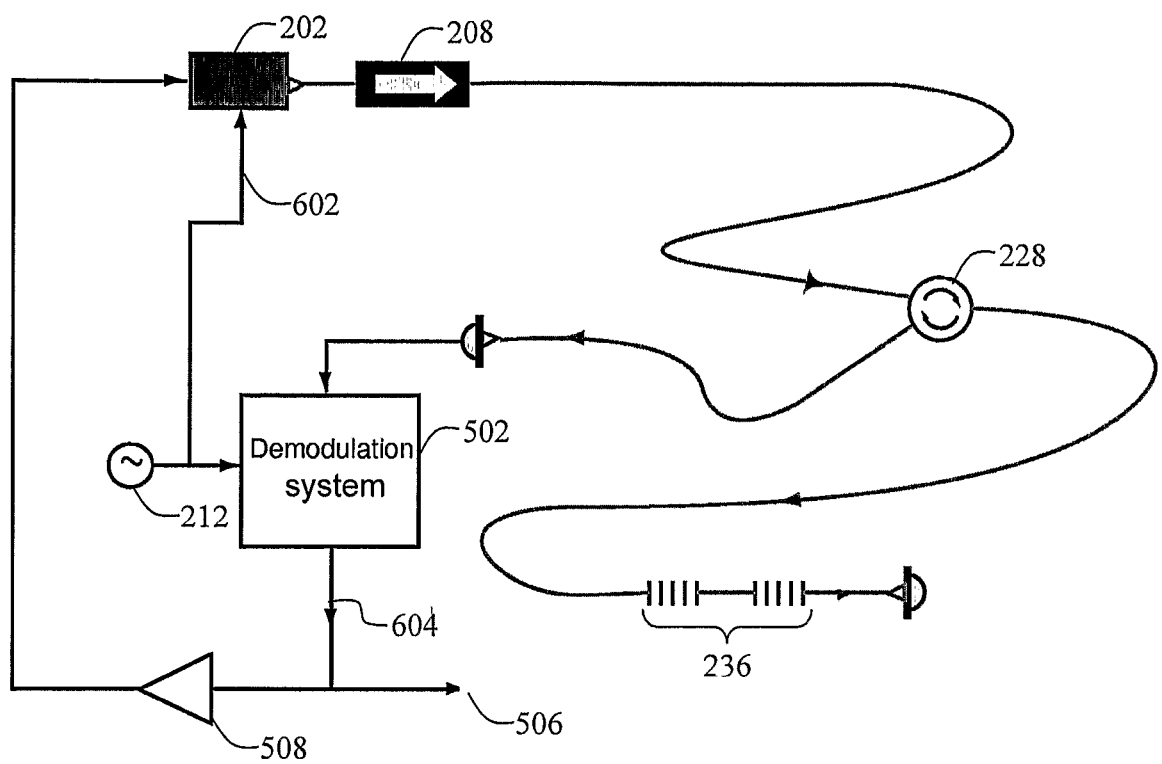
FIG. 6 is a schematic drawing of a further experimental implementation of the apparatus for interferometric sensing.

In an experimental realisation of the apparatus for interferometric sensing with feedback and wavelength control, shown in FIG. 5, the error signal from a demodulation system 502 is amplified and/or frequency-filtered by, the amplifier 508, then fed back into the wavelength controller 402, for example a piezoelectric device that tunes the cavity length of the laser. FIG. 6 shows a further experimental realisation, where the laser output is modulated by directly modulating the laser's drive current 602, rather than phase-modulating the output externally with an external phase modulator 216.

Frequency locking the laser source 100 to the Fibre Bragg Grating Fabry-Perot Interferometer (FFP) 236 allows the laser 202 to follow a mode of the FFP 236 as it changes frequency in response to thermal drift, and low frequency strain. At frequencies above thermal drift, the in-loop error signal (i.e. feedback 404) represents acoustic signals picked up the FFP 236. For low frequencies the signal may be recovered with large dynamic range. The dynamic range of the sensor will be limited only by the interrogating laser's frequency tuning range. This error signal output in feedback 404 is proportional to the strain induced in the FFP 236 as a result of the acoustic signal impinging on the fibre. The signal in feedback 404 may be tapped off at the input to the wavelength controller 402 and is valid over the frequency range from DC to the unity gain bandwidth of the feedback control loop. The low frequency dynamic range can be far larger than the full-width half-maximum (FWHM) of the FFP mode, which is typically 100 to 200 MHz since the laser frequency tuning range can be in excess of 100 GHz. Signals picked up by the sensors above the unity gain frequency of the control loop can be accessed at the output of the demodulation system 502. These are out-of-loop signals and the dynamic range will be limited by the FWHM of the FFP mode width (eg 200 MHz) as they are in the frequency range above unity gain where the locking dynamics have a negligible effect, thus, the sensor dynamic range is optimised by maximising the control bandwidth.

The preferred technique for frequency locking the laser source 100 to the fire interferometer 106 is the Pound-Drever-Hall (PDH) locking scheme. In theoretical models of the Pound-Drever-Hall locking scheme, the interferometric sensor may be approximated by analysis of a free space resonant cavity; within the bandwidth of concern, the Bragg reflectors used in the FFP 236 are broadband, and both the reflectors and resonator refractive index are non-dispersive. At the optical carrier frequency $\nu$, the complex reflection response of a lossless FFP formed by two matched reflectors separated by distance L, both with amplitude reflection coefficient r, can be expressed as $$\tilde{F}(\nu) = \frac{\tilde{E}_r}{\tilde{E}_i} = \frac{r(1-\exp(-i\theta(\nu)))}{1-r^2\exp(-i\theta(\nu))}$$
$$= A(\nu)\exp[i\phi(\nu)]$$

where $E_r$ and $E_i$ are the reflected and incident electric fields; $\theta(\nu)=2\pi\nu nL/c$ is the round-trip phase in a material of refractive index n; and $A(\nu)$ and $\phi(\nu)$ are, respectively, the amplitude and phase response. The FFP has a full-width half-maximum (FWHM) bandwidth of $\Delta\nu_{0.5}$.

The Pound-Drever-Hall locking scheme involves interrogating the FFP 236 with the laser carrier phase modulated at $\nu_m$, while measuring the reflected power with a photodetector. After electronic demodulation and low-pass filtering, this signal can be reduced to $$V(\nu) \propto 2\sqrt{P_c P_s} \times \left\{ \begin{array}{l} \Re\left[\tilde{F}(\nu)\tilde{F}^*(\nu_+) - \tilde{F}^*(\nu)\tilde{F}(\nu_-)\right]\cos(\psi) + \\ \Im\left[\tilde{F}(\nu)\tilde{F}^*(\nu_+) - \tilde{F}^*(\nu)\tilde{F}(\nu_-)\right]\sin(\psi) \end{array} \right\} \quad (1)$$

where the cross term $$\tilde{C}(\nu_\pm) = \tilde{F}(\nu)\tilde{F}^*(\nu_+) - \tilde{F}^*(\nu)\tilde{F}(\nu_-) \quad (2)$$
$$= A(\nu)A(\nu_+)\exp\{i[\phi(\nu)-\phi(\nu_+)]\} -$$
$$A(\nu)A(\nu_-)\exp\{i[\phi(\nu_-)-\phi(\nu)]\}$$

$\nu_+ = \nu + \nu_m$ and $\nu_- = \nu - \nu_m$; $P_c$ is the power in the carrier while $P_s$ is the power in each sideband. The phase shift $\psi$ is set to optimise the demodulated error signal. In general this is achieved when $$\psi = \tan^{-1}\left\{ \frac{\frac{d[\Im[\tilde{C}(\nu_\pm)]]}{d\nu}}{\frac{d[\Re[\tilde{C}(\nu_\pm)]]}{d\nu}} \right\}_{\theta(\nu)=m2\pi}$$

where m is an integer. The round-trip phase $\theta(\nu)=m2\pi$ when the carrier is resonant with the FFP.

From equation (2), it can deduced that in the case of $\nu_m \ll \Delta\nu_{0.5}$, $\phi(\nu)-\phi(\nu_+)$ and $\phi(\nu_-)-\phi(\nu)$ are both very small, and so the expression is dominated by its real part. Conversely, when $\nu_m \ll \Delta\nu_{0.5}$, the sidebands are well outside the linewidth of the FFP when the carrier is near resonance. In this case these phase-difference terms approach $\pi/2$ and the expression is dominated by its imaginary part. If the FFP lineshape is symmetric and the carrier is at resonance, $A(\nu_+)=A(\nu_-)$ and $\phi(\nu)-\phi(\nu_+)=\phi(\nu_-)-\phi(\nu)$ for both cases, implying that equation (2), and hence equation (1), become zero. This is the usual lock point of the frequency servo. From equation (1), it is clear that when the cross term equals 0 (locked to resonance), the output $V(\nu)$ is equal to zero and independent of $P_c$ and $P_s$. Hence, when locked, the Pound-Drever-Hall system is immune to variations in laser intensity noise to the first order. In comparison, a fringe-side locking technique shows no implicit immunity to intensity noise, and requires additional intensity monitor and subtraction electronics.

Figure 7:
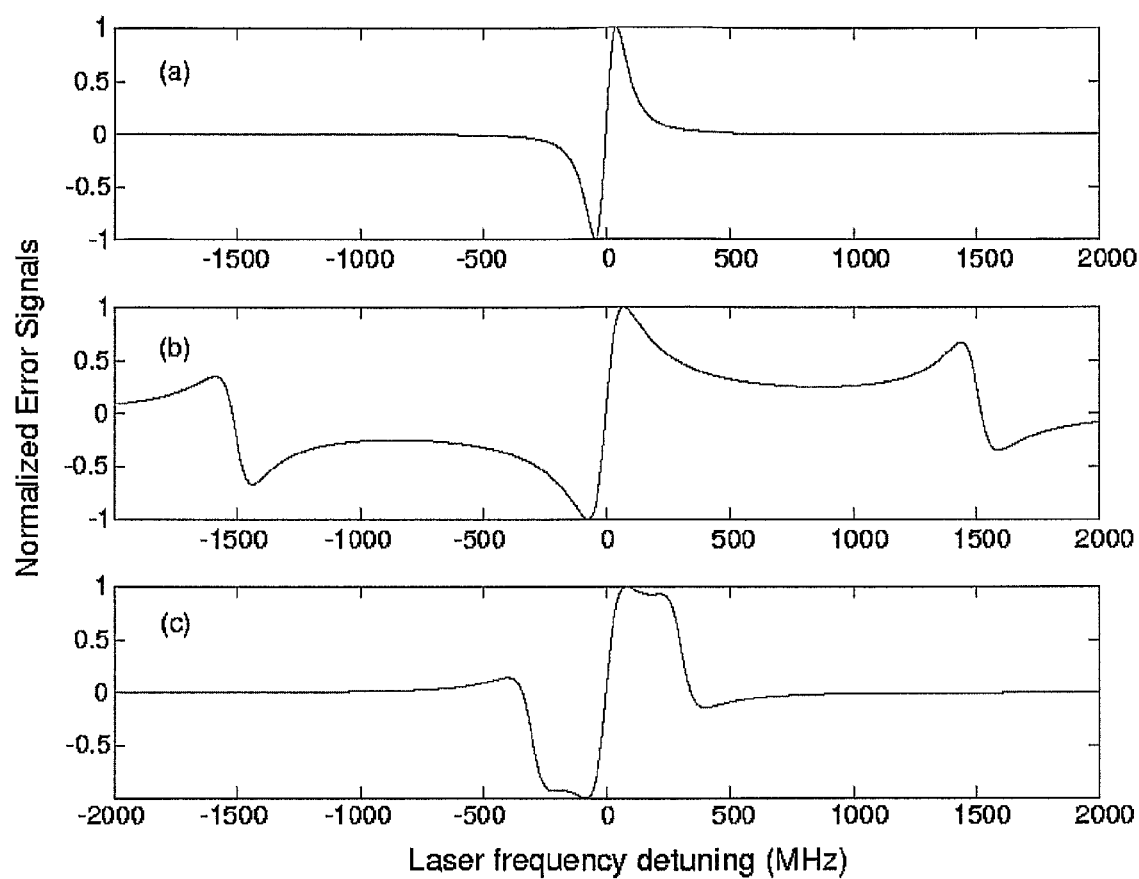
FIG. 7 is a graph of theoretical plots for normalised Pound-Drever-Hall error signals when a Fibre Bragg Grating Fabry-Perot Interferometer (FFP) of 150 MHz linewidth is interrogated with phase modulation sidebands of (a) 15 MHz, (b) 1500 MHz, and (c) 300 MHz.

The first curve (i.e. graph (a) in FIG. 7 illustrates the theoretical error signal for the case of $\nu_m/\Delta\nu_{0.5}=0.1$, while the second curve (i.e. graph (b) is for the case of $\nu_m/\Delta\nu_{0.5}=10$, when $\nu$ is scanned across the resonance of a FFP. The third curve (i.e. graph (c) of FIG. 7 shows the intermediate case where $\nu_m/\Delta\nu_{0.5}=2$. The two satellite error signals in the second curve are due to the sidebands undergoing the FFP resonance, whereas in the third curve the error signals due to the carrier and sidebands merge to form a single and almost square error signal. The plots assume a resonance linewidth of 150 MHz, and it is interrogated using phase modulation frequencies 15 MHz, 1500 MHz and 300 MHz respectively.

The case where $\nu_m \gg \Delta\nu_{0.5}$ describes the classic Pound-Drever-Hall locking regime, involving high finesse Fabry-Perot cavities. The principles of operation behind both extremes are similar and, both will be referred to as Pound-Drever-Hall locking in this document.

Figure 8:
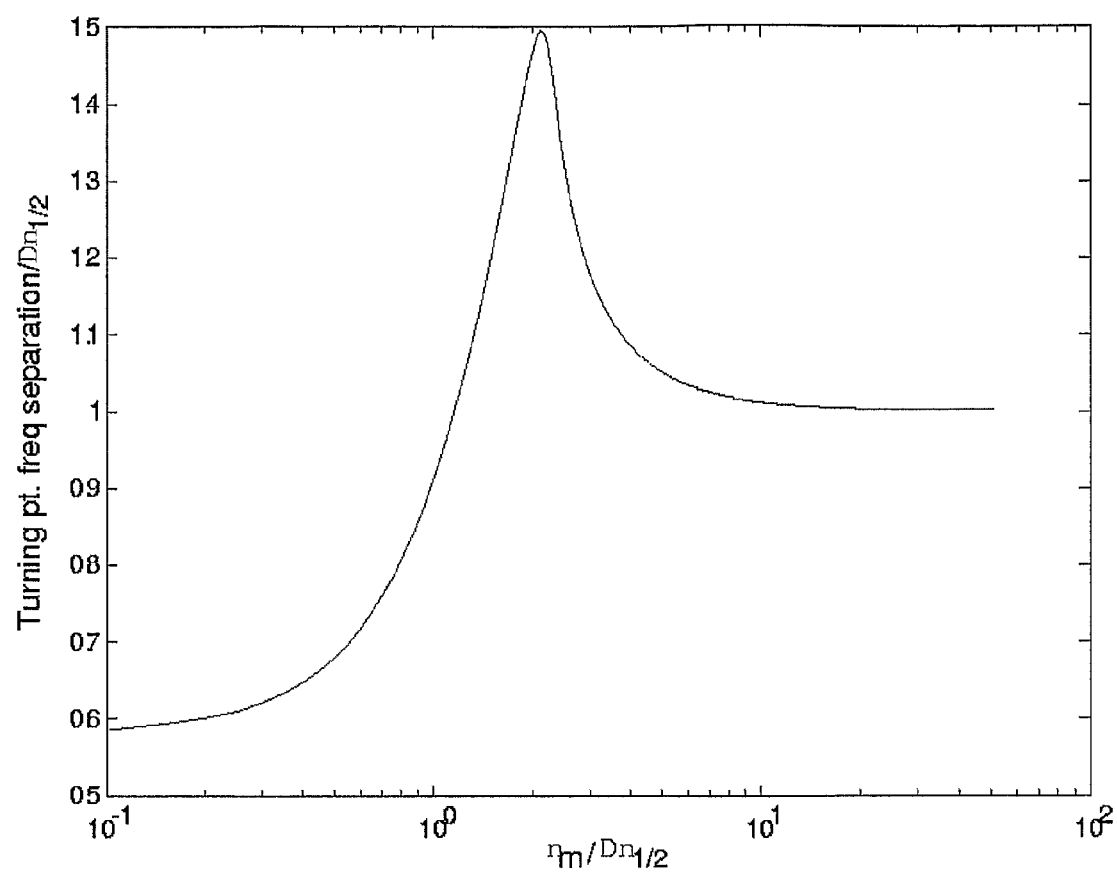
FIG. 8 is a graph of a theoretical plot for the frequency separation of the error signal turning points versus modulation frequency. Both axes are normalised by $\Delta v_{0.5}$.

For a given resonance FWHM, $\Delta\nu_{0.5}$, the frequency separation between the turning points of a Pound-Drever-Hall error signal is dependent on $\nu_m$. It approaches asymptotic values for both cases of $\nu_m \ll \Delta\nu_{0.5}$ and $\nu_m \gg \Delta\nu_{0.5}$, as illustrated by the theoretical plot in FIG. 8. The plot is calculated with $\psi$ optimised for each $\nu_m$.

Figure 9:
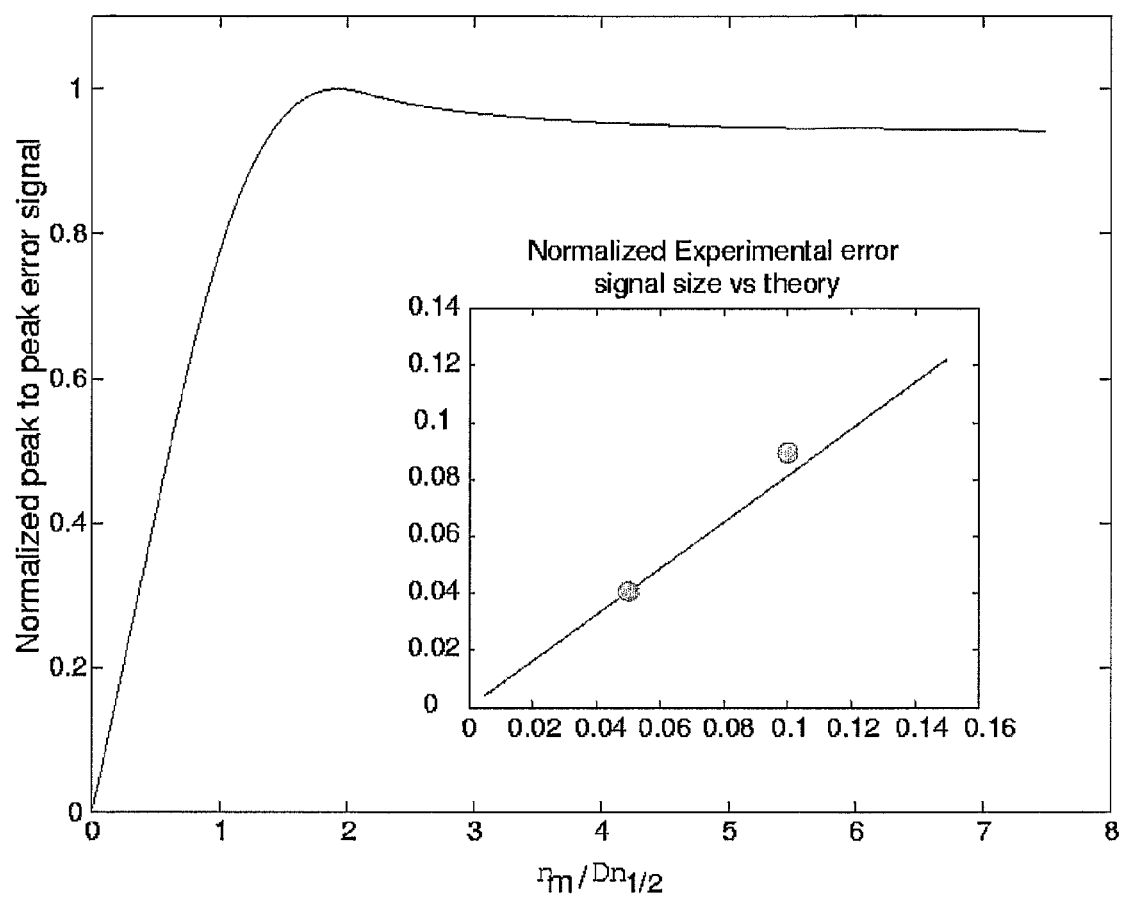
FIG. 9 is a graph of a theoretical plot for the normalised peak-to-peak error signal versus modulation frequency, normalised by $\Delta v_{0.5}$. The inset shows normalised experimental operating regimes for two resonances, overlaid with an expanded theoretical plot.

On the other hand, for a given modulation frequency, the size and therefore slope of the error signal is dependent on the FWHM bandwidth $\Delta\nu_{0.5}$. FIG. 9 shows the theoretical plot of peak-to-peak normalised error signal size vs normalised FWHM bandwidth. The error signal size approaches zero when $\nu_m \ll \Delta\nu_{0.5}$, but reaches an asymptotic value when $\nu_m \gg \Delta\nu_{0.5}$.

Figure 10:
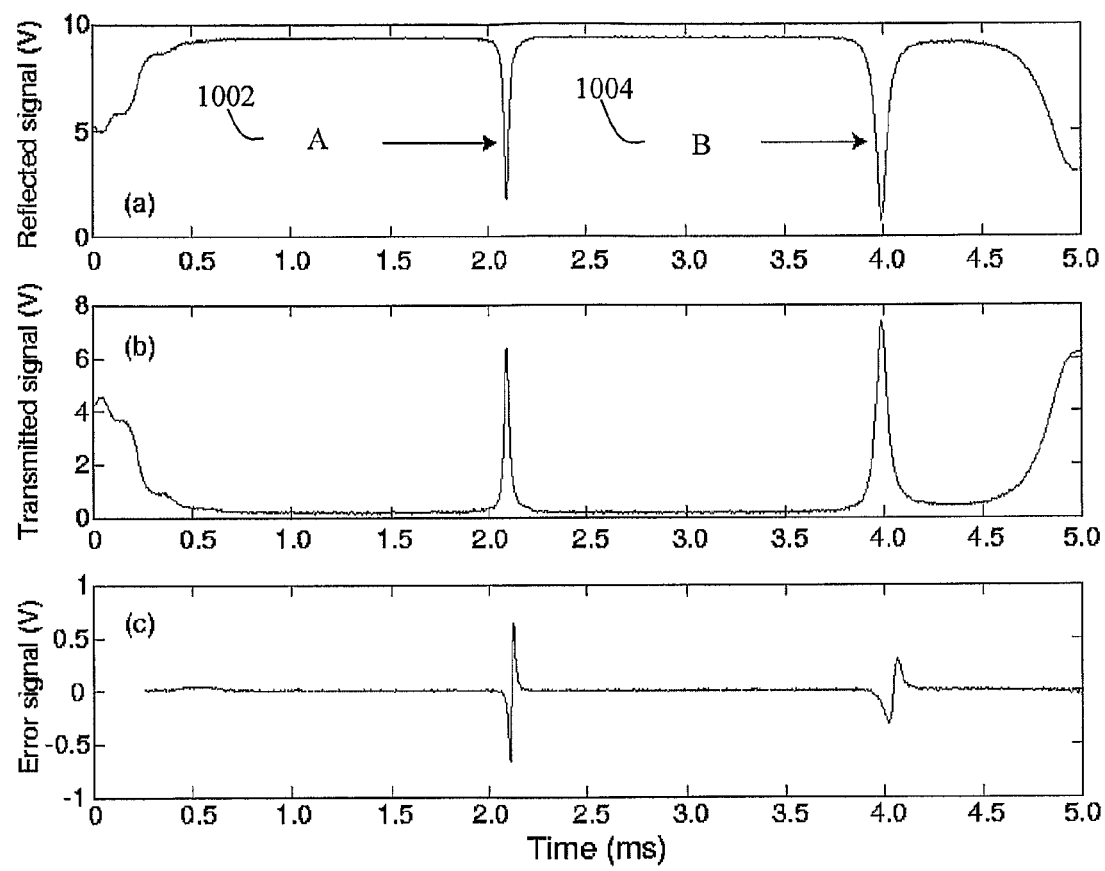
FIG. 10 shows experimental scans for (a) reflection, (b) transmission, and (c) a Pound-Drever-Hall error signal for a Fibre Bragg Grating Fabry-Perot Interferometer (FFP).

In the apparatus shown in FIG. 5, a 95 Hz voltage ramp of 2 Vp-p and 50:50 symmetry may be applied to the input of the laser's piezoelectric transducer to sweep the laser carrier frequency equating to a slope of 380 V/s. Three signals that may be recorded using a digital oscilloscope while the laser frequency is scanned are shown in FIG. 10. The first curve (i.e. graph (a) of FIG. 10 shows an example signal reflected by the FFP 236, as measured by the reflection photodetector 248. The second curve of FIG. 10 shows an example signal transmitted and measured by the transmission photodetector 242. The third curve of FIG. 10 shows a corresponding example mixed down experimental error signal 256. FIG. 10 also shows two FFP resonances within the Bragg grating bandwidth in the first curve, with differing peak heights and $\Delta\nu_{0.5}$'s; the resonances are the High Finesse Mode 1002 and the Low Finesse Mode 1004.

The differences between the high finesse and low finesse resonance modes in FIG. 10 could be due to the frequency dependent reflectivity of the Bragg grating pair, resulting in differing finesses at the two resonances. Since the gratings in this example were not apodised during the fabrication process, a higher reflectivity near the centre of their bandwidth was expected; the higher finesse (ie narrower width) of the first resonator mode confirms this. Further, by comparing the heights of the two peaks in FIG. 10(a), the lower finesse resonance is seen to be closer to being impedance matched. At this low-finesse mode, nearly all of the laser light is transmitted and the reflected signal approaches zero. The difference in transmitted intensity, compared with the under-coupled high finesse mode, may be explained by ultraviolet-induced loss in the resonator, particularly in the 10-mm spacing between the grating pair. The higher finesse resonance transmitted a lower intensity due to its greater resonator round-trip number, or total storage time, which resulted in greater total loss while circulating within the resonator. To reduce this loss, the ultraviolet laser may be controlled to avoid fibre exposure between the grating pair during the resonator fabrication process.

Figure 11:
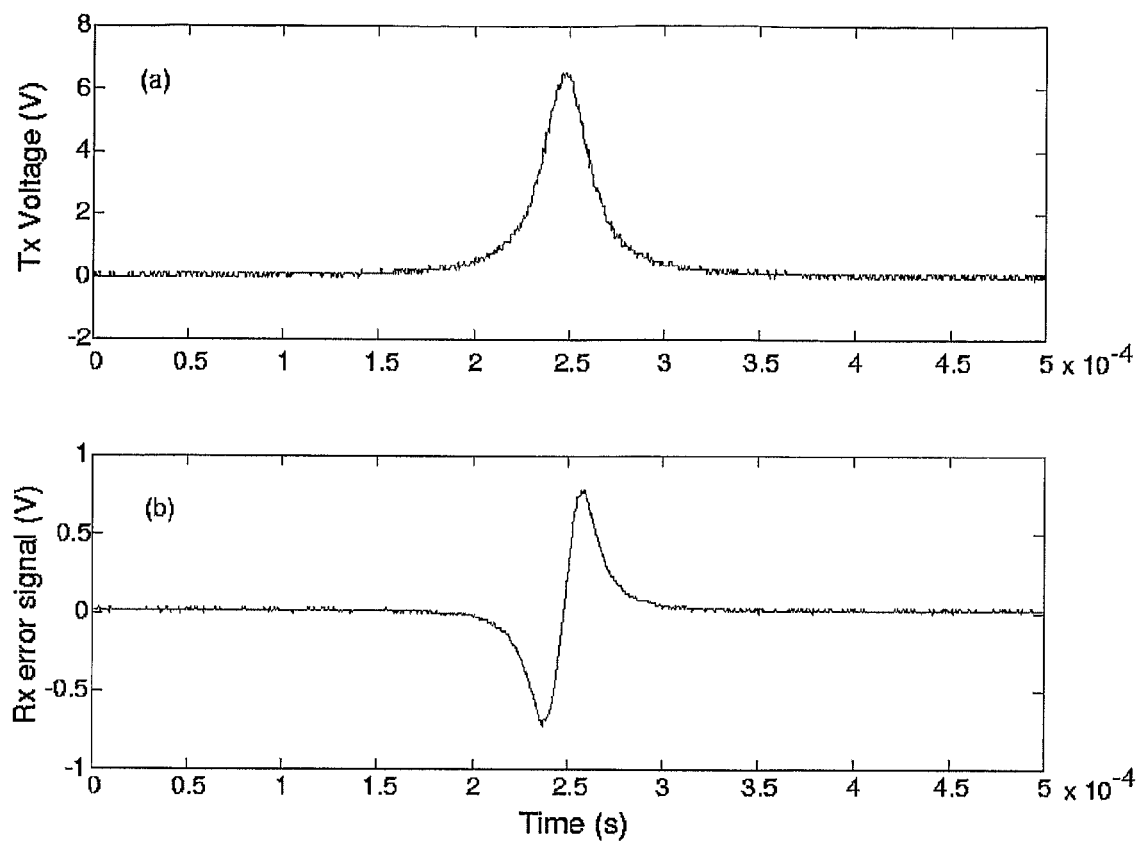
FIG. 11 shows enlarged portions of experimental scans for (a) a transmitted power signal, and (b) a reflected error signal for a Fibre Bragg Grating Fabry-Perot Interferometer (FFP).

The transmission power curve (second curve in FIG. 10) and the reflected error signal (third curve in FIG. 10) for the high finesse resonance are shown enlarged in FIG. 11. The FWHM time for the piezoelectric transducer scan in the first curve of FIG. 11 is approximately 30 µs, which would correspond to 11.4 mV on the piezoelectric transducer. For a laser piezoelectric transducer calibrated to provided 12.5 GHz/V of tuning, the FWHM bandwidth of this mode would be 143 MHz. For comparison, the low finesse (ie broader) resonance has a FWHM time of 66 µs, which implies a $\Delta v_{0.5}$ bandwidth of 314 MHz. The separation between the two resonance peaks 1002 and 1004 is approximately 1.9 ms, as seen in FIG. 10, corresponding to a spectral range of 9 GHz, hence the narrower mode has a finesse of approximately 63 while the broader resonance has a finesse of approximately 29.

The $v_m/\Delta v_{0.5}$ ratio for the higher finesse mode in FIG. 10 is approximately 0.1. The corresponding peak-to-peak time for its error signal in the second curve of FIG. 11 is approximately 20 µs, corresponding to an error signal turning point frequency separation to $\Delta v_{0.5}$ ratio of approximately 0.60. On the other hand, the lower finesse resonance has an error signal peak-to-peak time of 38 µs, which corresponds to $v_m/\Delta v_{0.5}$ of approximately 0.05, and an error signal turning point separation to $\Delta v_{0.5}$ ratio of approximately 0.58. The error signal turning point separation to $\Delta v_{0.5}$ ratios for the two modes are close to each other, and agree with the values as predicted in FIG. 8. At these linewidths, $v_m$ is sufficiently small relative to $\Delta v_{0.5}$ to approach the asymptotic value of the lower limit.

The peak-to-peak error signal for the higher finesse mode is larger than that of the lower one, as seen in the third curve of FIG. 10, since $v_m/\Delta v_{0.5}$ for the higher finesse mode is twice that of the lower finesse mode, as predicted by the theoretical plot in FIG. 9. The error signal peak-to-peak voltage for the high finesse mode may be measured to be for example 1.4 V, while that for the lower finesse resonance may be 0.63 V. These two points, for $v_m/\Delta v_{0.5}$ of 0.1 and 0.05, are normalised and overlaid with the theoretical plot in the inset of FIG. 9.

Assuming an effective refractive index of 1.45, a free spectral range of 9 GHz would yield a resonator length of 11.5 mm, implying that an effective reflection point of the gratings to be approximately 0.75 mm inside each grating.

The slope of the error signal through resonance is approximately 19 nV/Hz for the higher finesse mode, and approximately 9 nV/Hz for the lower finesse mode. The higher finesse resonance is a preferred mode for Pound-Drever-Hall locking, as it provides more sensitive frequency and displacement discrimination than the lower finesse mode.

Figure 12:
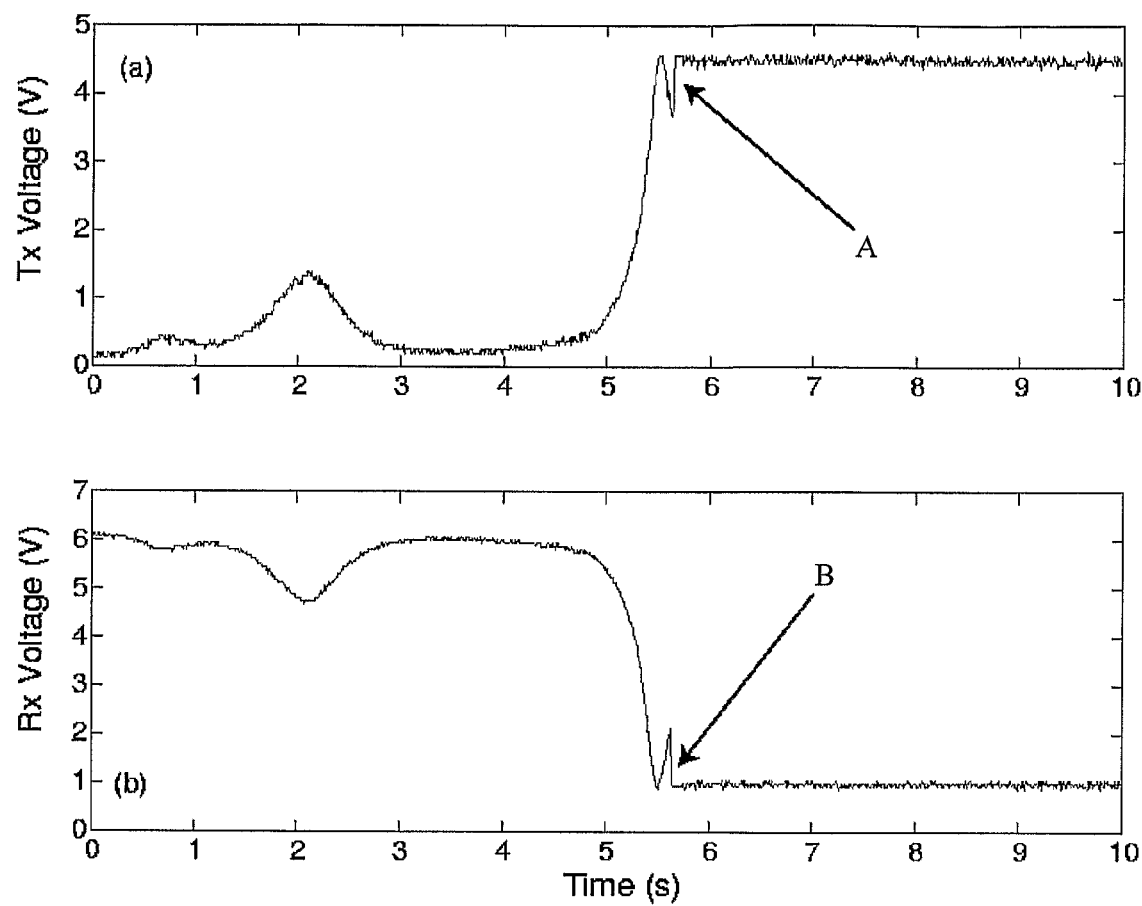
FIG. 12 shows oscilloscope traces for (a) transmitted, and (b) reflected intensities during lock acquisition. The feedback loop was engaged after approximately 5.5 seconds.

To initiate feedback in the apparatus of FIG. 5, the voltage ramp from the signal generator may be turned off, and the piezoelectric transducer DC offset voltage tuned slowly while the transmitted and reflected laser intensities are monitored with an oscilloscope. When the laser wavelength is nearly resonant with the chosen FFP 236 peak, the transmitted intensity approaches its maximum, and the feedback loop may then be engaged to acquire lock. An exemplary result from this process is shown by the digital oscilloscope traces of FIG. 12. The feedback amplifier 508 may, for example, have a single real pole response with a corner frequency of 0.03 Hz. The total feedback loop may have a DC gain of approximately 1000 and a unity gain bandwidth of around 40 Hz. A apparatus of this type would stay locked for several hours. Lock termination would occur when the grating drifts outside the laser tuning range.

Figure 13:
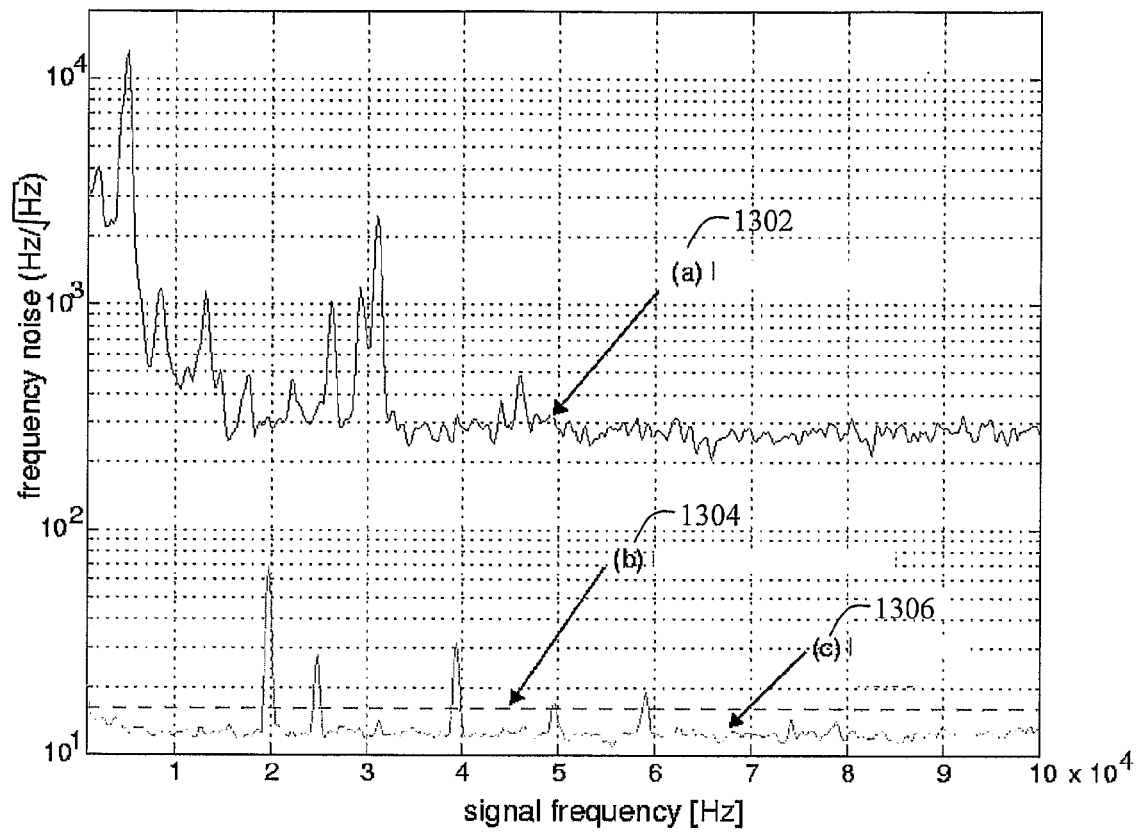
FIG. 13 shows (a) frequency noise of a Fibre Bragg Grating Fabry-Perot Interferometer (FFP) sensor as measured by a dynamic signal analyser, overlaid with (b) calculated shot noise, and (c) measured electronic noise.

FIG. 13 shows an example frequency noise spectrum 1302, measured with the interferometric apparatus with active feedback, with components as described above. The system noise is shown overlaid with the calculated shot noise 1304 and measured electronic noise 1306. At frequencies above ambient excitation, the free running frequency noise of the laser would limit this measurement to approximately 300 Hz/√Hz. Assuming the laser has a Lorentzian lineshape with white spectral density of frequency noise $S_f$, the 3-dB linewidth of the laser $\Delta v_L$ can be estimated by $$\Delta v_L = \pi S_f^2,$$

where $S_f$ has units of Hz/√Hz. Thus, the broadband frequency noise of approximately 300 Hz/√Hz corresponds to an intrinsic laser linewidth of approximately 280 kHz, being consistent with the manufacturer's estimate of 300 kHz for the example laser.

The responsivity of a Bragg grating can be estimated by $$\frac{1}{\lambda_B} \frac{\delta \lambda_B}{\delta \varepsilon} = 0.78 \varepsilon^{-1} \tag{3}$$

where $\varepsilon$ is the strain perturbation, and $\lambda_B$ is the Bragg wavelength. For example, 1 pm of induced grating wavelength shift corresponds to a strain of approximately 0.8 µε. At $\lambda_B$=1550 nm, equation (3) can be rearranged to arrive at the conversion factor $$\frac{\delta \varepsilon}{\delta v_B} = \frac{\lambda_B}{0.78c}$$
$$= 6.6 \times 10^{-15} \frac{\varepsilon}{Hz}$$

where $\Delta v_B$ is the equivalent induced grating frequency shift. Since 1 pm is equivalent to 125 MHz at 1550 nm, a system with a high frequency noise floor equivalent to that shown in FIG. 13 would have a broadband strain sensitivity of approximately 2 pε/√Hz.

The shot noise 1304 in FIG. 13 was calculated as follows:

$$V_{SN} = \alpha \sqrt{2egV_{dc}} \frac{V_{rms}}{\sqrt{Hz}}$$

where $V_{SN}$ is the equivalent shot noise voltage; e=1.602×10⁻¹⁹ C is the electronic charge; $V_{DC}$ is the DC output voltage of the photodetector when the system is locked; g is the transimpedance gain of the photodetector; and a, is the mixer conversion gain. The quotient of $V_{SN}$ by the error signal slope then gives the shot noise in units of Hz/√Hz, which can be calculated to be 16 Hz/√Hz, corresponding with a limiting shot-noise sensitivity of approximately 100 fε/√Hz (=16

Hz/√Hz×Δε/Δν$_B$) for this example apparatus. The electronic noise 1306 is the dark noise measured at the mixer output.

Within the unity gain bandwidth of the feedback system, the sensor dynamic range depends on the laser optical frequency tuning range. For an example laser with a piezoelectric transducer tuning range of 50 GHz, the low frequency dynamic range of the system would be limited to 330 με (=50× 10$^9$ Hz×Δε/Δν$_B$). Assuming a breaking stress of >100 kpsi, and a Young's modulus of 1.02×10$^4$ kpsi for fused silica, the breaking strain would be >9800 με, which is typically beyond the tuning range of the laser. Above the unity gain bandwidth, the sensor dynamic range would be limited by the FWHM bandwidth of the resonator to 0.9 με (=143×10$^6$ Hz×Δε/Δν$_B$). Hence, for large dynamic range applications, the preferred operating approach would be to expand the unity gain bandwidth out to a maximum, and perform in-loop measurements at the laser piezoelectric transducer input.

In the apparatus shown in FIG. 6, current modulation may be used to modulate the laser output. An example of a laser source is a New Focus Vortex 6029 tunable external-cavity diode laser centred at 1550.15 nm, with about 0.40 nm, or approximately 50 GHz tuning range. The wavelength of the laser may be tuned by applying a voltage to the piezoelectric transducer, thus changing the laser cavity length. The Fibre Bragg Grating Fabry-Perot Interferometer (FFP) 236 may consist of a pair of nominally matched 13.5 dB Bragg gratings (R approximately 95.5%) each 15-mm long, spaced 10 mm apart. The selected FFP resonance may have a full-width half-maximum (FWHM) linewidth of approximately 143 MHz. Demodulation and feedback are described above with reference to FIG. 5. This error signal 604 serves two purposes: (i) at low frequencies (<20 Hz) the signal is used by the servo amplifier to feed back to the laser 202 to ensure the laser stayed locked to the centre of the FFP resonance; (ii) at higher frequencies (>100 Hz) the error signal provides a dynamic strain readout of the FFP 236.

Figure 14:
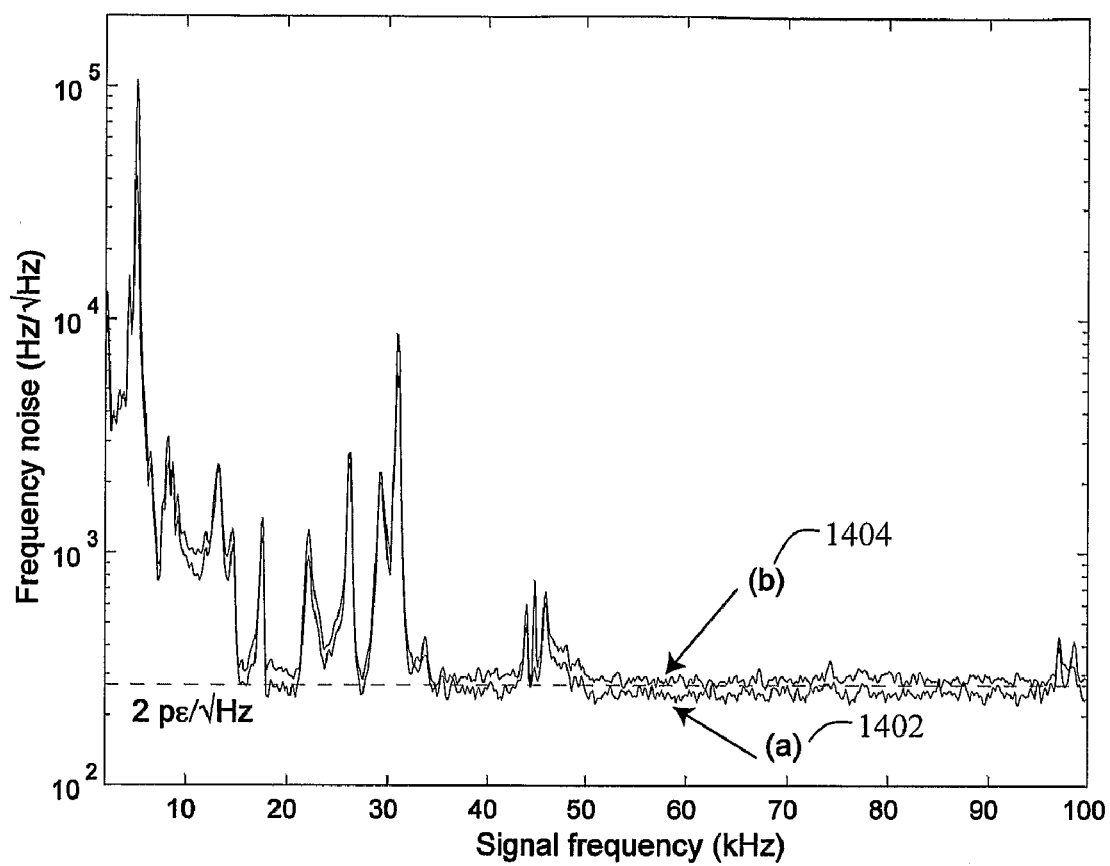
FIG. 14 shows frequency noise of a interferometric sensor as measured by a dynamic signal analyser, formed by a Fibre Bragg Grating Fabry-Perot Interferometer (FFP) interrogated with a diode laser that was (a) purely phase modulated; and (b) current modulated.

FIG. 14 compares the frequency noise of two example schemes: external phase modulation (as shown by way of an example schematic in FIG. 5) in graph (c) 1402, and direct current modulation (as shown by way of an example schematic in FIG. 6) in graph (b) 1404.

Using the empirical model for grating responsivity described above, this frequency noise spectral density may be converted into equivalent fibre strain. The results in FIG. 14 from these example systems illustrate that external phase modulation and direct current modulation are both able to yield a broadband strain sensitivity of approximately 2 pε/√Hz. Both methods may exhibit the same components of audio frequency ambient noise, including the piezoelectric transducer resonance due to closed-loop excitation, and broadband acoustic noise at low frequencies. The two modulation schemes may yield comparable broadband sensitivities.

Figure 15:
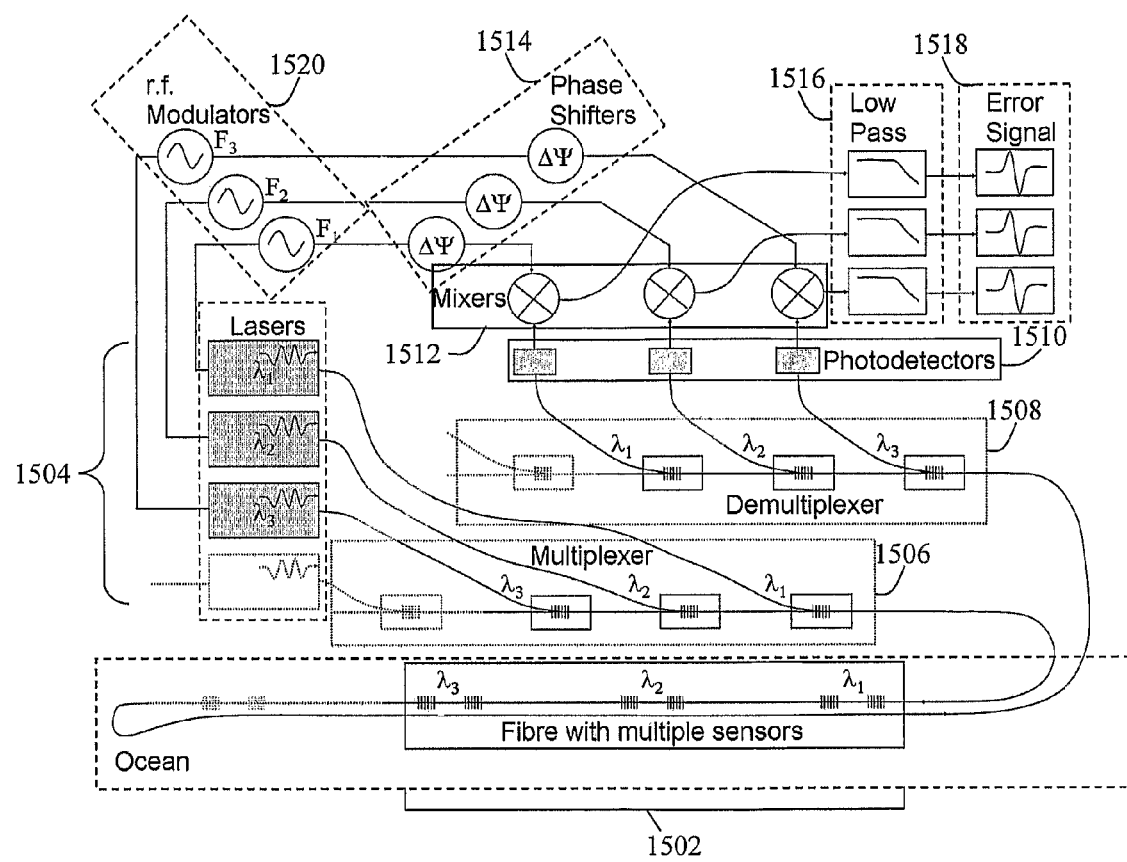
FIG. 15 is a schematic drawing of an apparatus for interferometric sensing with a plurality of sensors.

In an apparatus for interferometric sensing with a plurality of sensors, shown in FIG. 15, a plurality of modulated signals from a plurality of modulated laser sources may be combined, using Wavelength-Division Multiplexing (WDM) methods, into a single optical fibre. A plurality of sensor elements 1502, each comprising of a Fibre Bragg Grating Fabry-Perot Interferometer 236, is arranged in series along a single length of optical fibre. The sensors may be arranged such that the optical output signal comes from transmission through the interferometers, as depicted in FIG. 15, or such that the optical output signal arises from reflection from the interferometers, as explained above. Each interferometer in the fibre is responsive to light at a separate selected wavelength, $λ_1$, $λ_2$, $λ_3$, ..., as shown in FIG. 15; each interferometer is interrogated by a beam of radiation corresponding to its operational wavelength. The wavelength spacing of the separate selected wavelengths typically may be about 0.25 nm, limited by available WDM systems and Fibre Bragg Grating Fabry-Perot Interferometer structures.

In the example shown in FIG. 15, the interrogating laser beams, each at a separate selected wavelength, arise from a plurality of separate laser sources, 1504, and the beams are combined with optical multiplexers 1506. The radiation from each laser may have a central wavelength controlled by a corresponding wavelength controller, and is modulated by one of a plurality of radio-frequency modulators 1520. The plurality of optical output signals, indicative of the optical lengths of said interferometers, are directed to separate demodulators using an optical demultiplexer 1508, or similar optics. The optical output signals may be demodulated via a plurality of photodetectors 1510, mixers 1512 and phase-shifted local oscillator signals (from the corresponding radio-frequency modulators 1520) in a manner described above for the single-interferometer apparatus. The demodulated signals are low-pass filtered and the error signals 1518 observed to indicate the optical lengths of the interferometers. The error signals may be fed back to the wavelength controllers of the lasers, thus, enabling each laser to track the central wavelength of its corresponding interferometer via a frequency locking scheme such as the Pound-Drever-Hall technique described above.

Figure 16:
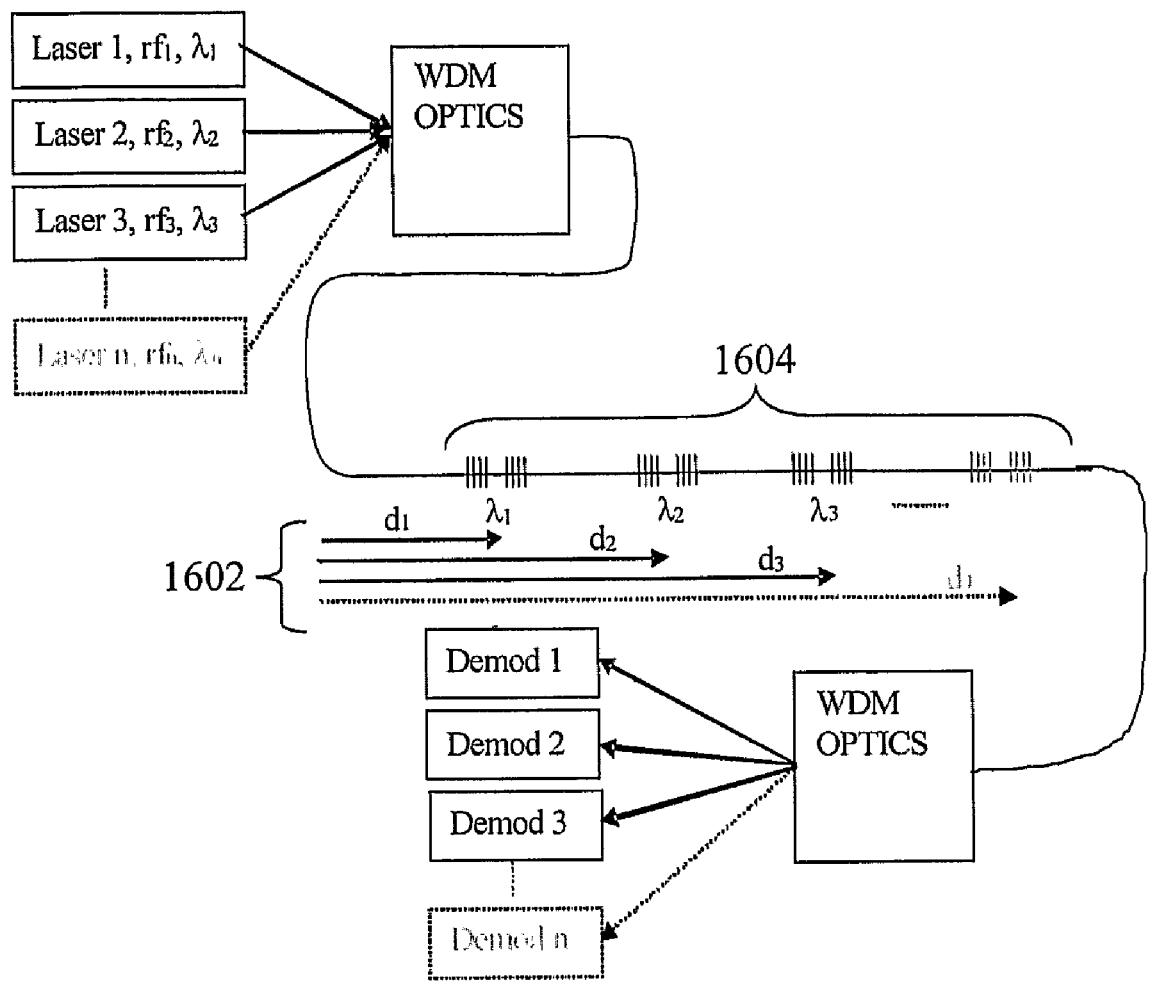
FIG. 16 is a hardware schematic drawing of the apparatus for interferometric sensing with a plurality of sensors.

With reference to FIG. 16, in the apparatus with a plurality of sensors, the distances 1602 between fibre interferometers 1604 may be 10s to 100s of metres, indicated by the letters $d_1$-$d_4$.

Figure 17:
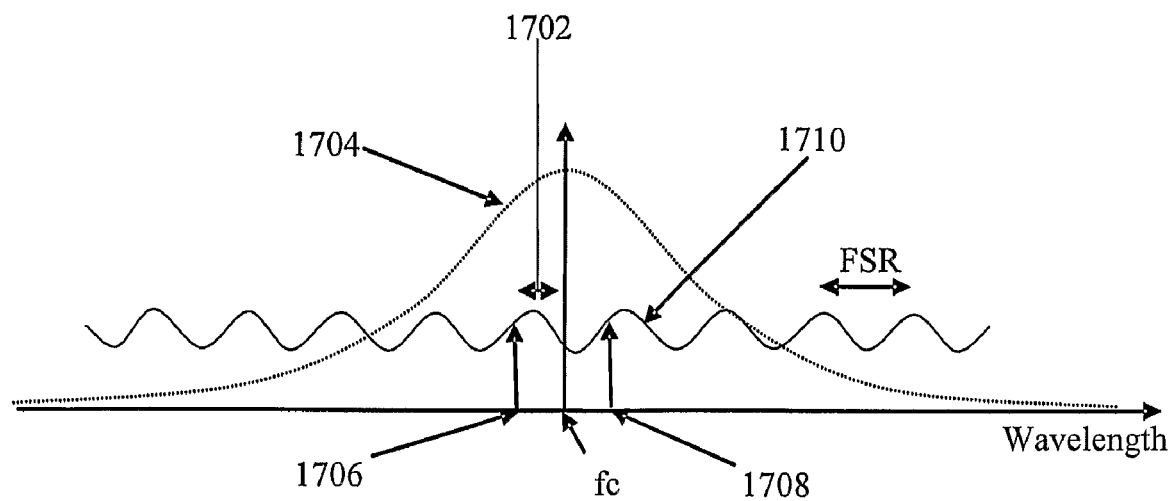
FIG. 17 is a frequency spectrum in the presence of a parasitic etalon, showing the optimal modulation frequency spacing to remove parasitic etalon influence.

In the apparatus with a plurality of sensors, the modulation frequencies are advantageously selected to be equal to a multiple of half the Free Spectral Range (FSR) of the secondary Fabry-Perot etalons (ie secondary interferometers) formed between successive Fibre Bragg Grating Fabry-Perot Interferometers along a single fibre; this removes residual etalon effects from the interrogation signal output. This frequency relationship is shown schematically in FIG. 17. If the modulator frequency 1702 (eg 10 to 20 MHz) is small compared to the FWHM width of the interrogated Fibre Bragg Grating Fabry-Perot Interferometer mode 1704 (eg 100 to 200 MHz), and the demodulator phase delay is optimised, the error signal represents the relative change of the sidebands 1706, 1708 with respect to each other. By fine-tuning the current modulation frequency 1702 to be half of the FSR, or a higher multiple of half the FSR, of the etalon frequency response 1710 between successive interferometers, both sidebands experience identical etalon effects. This may eliminate differential sideband-sideband attenuation and ensure that there is no error signal produced as a result of the parasitic secondary etalon. In such an apparatus, all sensor-sensor spacings in the same fibre must be a fixed and an identical length apart (or some multiple of a fixed spacing) to provide a constant etalon frequency response 1710. This spacing technique relaxes the apodisation requirements on each Fibre Bragg Grating Fabry-Perot Interferometer, and thus allows closer sensor channel spacing. For an etalon of $$FSR = \frac{c}{2nd},$$

the modulation frequency, $F_{mod}$, should be set to $$F_{mod} = \frac{j}{2} FSR$$

or $$F_{mod} = \frac{j}{4} \frac{c}{nd}$$

for each sideband to be equally reflected/transmitted by the etalon, where j is an integer, n is the refractive index and d is the spacing between sensors. For a given spacing between interferometer elements in a single fibre, where the spacing is large (eg a few 10s of meters), there are a plurality of modulation frequencies that fulfil the criteria, each with a different j value. Alternatively, rearranging for the spacing yields $$d = \frac{j}{4} \frac{c}{nF_{mod}}.$$

For example, when, F=20 MHz and n=1.446, the spacing should be multiples of 2.6 metres.

Figure 18:
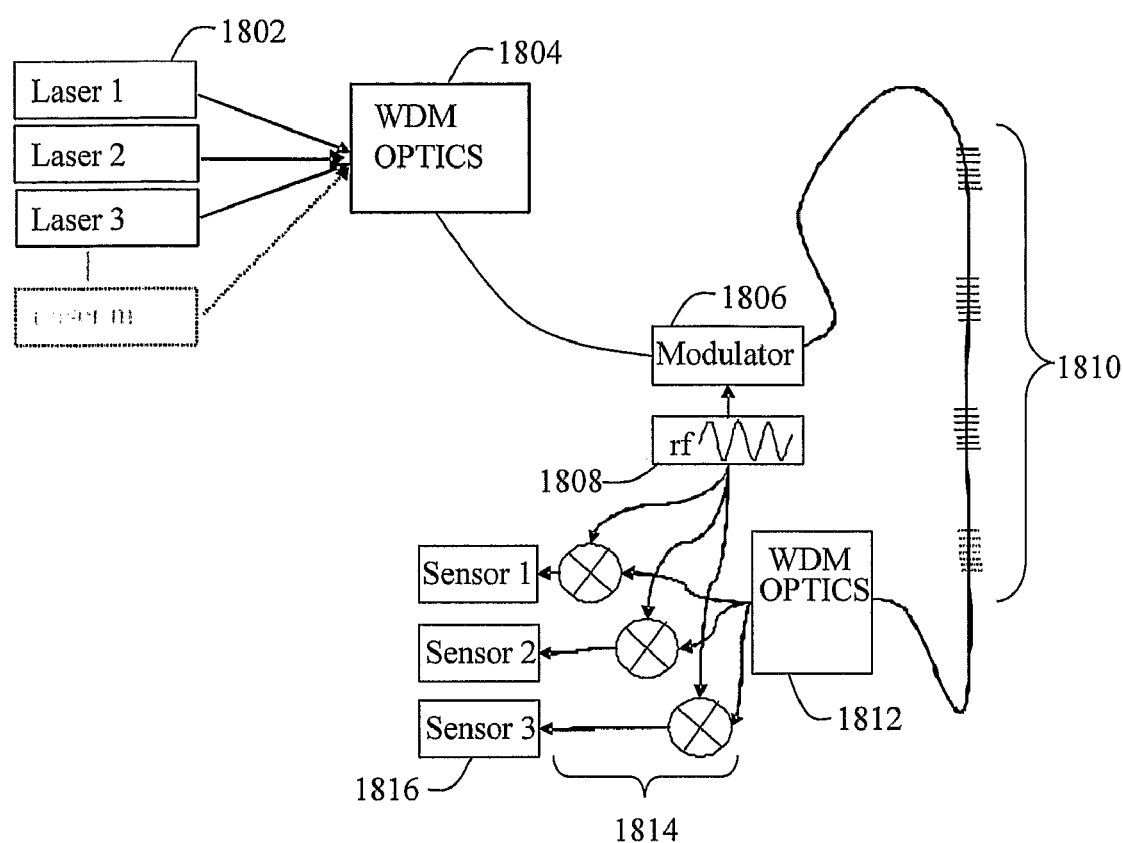
FIG. 18 is a schematic drawing of an apparatus for interferometric sensing with a plurality of sensors and a single demodulator.

An alternative realisation of the apparatus with a plurality of sensors, shown in FIG. 18, has a single radio-frequency phase modulator 1806 downstream from the WMD optics 1804 that combine the plurality laser outputs into a single fibre. This topology reduces the use of external phase modulators down to a single modulator per fibre. In this apparatus, a plurality of laser sources 1802 at separate selected wavelengths, $\lambda_1, \lambda_2, \lambda_3, \ldots$, are combined using Wavelength-Division Multiplexing (WDM) optics 1804 and modulated using a single optical modulator 1806, for example an external phase modulator. Only a single radio-frequency source is required to drive the modulator 1806. The radiation from the lasers 1802, combined into the single optical fibre, interrogate a plurality of interferometers 1810, each responsive to a separate selected wavelength $\lambda_1, \lambda_2, \lambda_3, \ldots$. The optical output signals, gathered through transmission or reflection, are separated into separate channels, corresponding to the separate wavelengths, using WDM optics 1812, then demodulated using separate mixers 1814 and separate electronic sensors 1816. In one realisation of the apparatus, the error signals may be fed back to the wavelength controllers of the lasers, thus enabling each laser to track the central wavelength of its corresponding interferometer via a frequency locking scheme (eg the PDH scheme) as described above.

Figure 19:
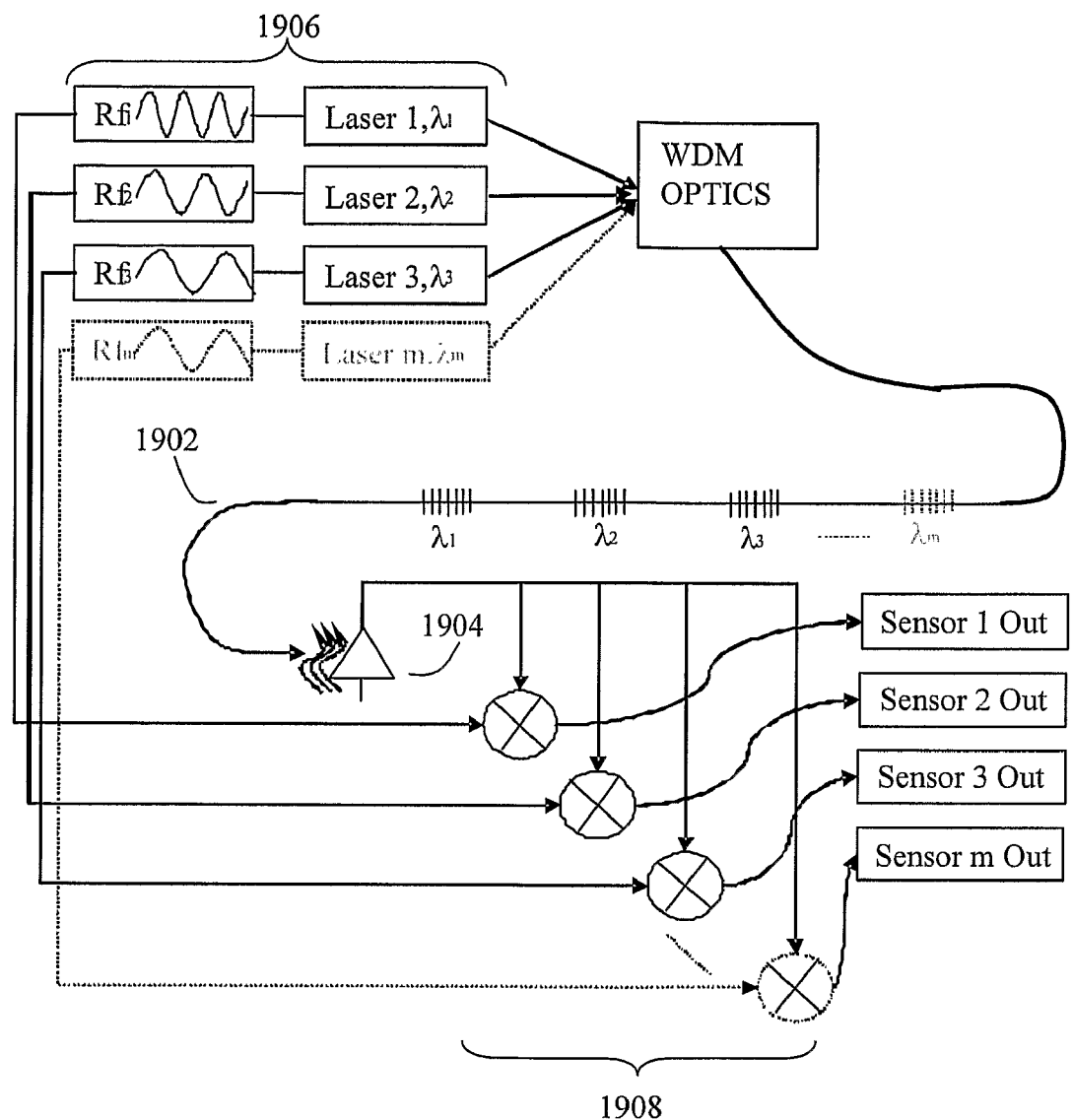
FIG. 19 is a schematic drawing of a apparatus for interferometric sensing with a plurality of sensors and a single photodetector.

In a further alternative realisation of the apparatus with a plurality of sensors, illustrated in FIG. 19, a plurality of optical output signals, arising from a plurality of interferometers in a single optical fibre 1902, can share a single photodetector 1904. In this apparatus, each laser output is modulated at a different radio frequency. After interrogation of each sensor i.e. FFP), demodulation at each respective modulation frequency, with a plurality of electronic mixers 1908, allows extraction of each acoustic sensor signal in isolation. This simplifies the detection optics by avoiding the need for splitter/combiner and other WDM optics at the array output. In one realisation of the apparatus, the error signals may be fed back to the wavelength controllers of the lasers, thus enabling each laser to track the central wavelength of its corresponding interferometer as described above.

It is to be appreciated that the embodiments of the invention described above with reference to the accompanying drawings have been given by way of example only and that modification and additional components may be provided to enhance the performance of the apparatus.

Throughout this specification and the claims which follow, unless the context requires otherwise, the word 'comprise,' and variations such as 'comprises' and 'comprising,' will be understood to imply the inclusion of a stated integer or step, or group of stated integers or steps.

The reference to any prior art in this specification is not, and should not be taken as, an acknowledgment or any form of suggestion that that prior art form part of the common general knowledge in Australia.

The invention claimed is:

1. An apparatus for interferometric sensing, comprising a plurality of single-longitudinal mode laser sources to each provide radiation at a corresponding selected wavelength, and at least one control modulator to frequency or phase modulate the radiation from each laser source; a plurality of Fabry-Perot interferometers formed by Bragg Gratings written into optical fibre, each interferometer having a resonance wavelength corresponding to one of the selected wavelengths and being responsive to the modulated radiation at one of the selected wavelengths to each produce a reflected or transmitted optical output signal dependent on the corresponding interferometer path length; and one or more demodulators to demodulate the optical output signals and produce a plurality of respective measurement signals indicative of the optical path lengths of the respective interferometers.

2. An apparatus as claimed in claim 1, further including a plurality of wavelength controllers respectively connected to the laser sources to control the selected wavelengths of said laser sources.

3. An apparatus as claimed in claim 2, wherein each wavelength controller includes an external optical cavity to which each corresponding laser source is frequency-locked to control the corresponding selected wavelength.

4. An apparatus as claimed in claim 2, wherein each laser source is provided with a drive current for generating the corresponding radiation, and each wavelength controller is connected to the corresponding laser source to adjust the drive current to control the corresponding selected wavelength of each corresponding laser source.

5. An apparatus as claimed in claim 2, including at least one external frequency or phase modulator connected to the laser sources to receive the provided radiation from the laser sources, and connected to the control modulator to receive a modulation signal from the control modulator to drive the external frequency or phase modulator and control the modulation of the radiation of the laser sources.

6. An apparatus as claimed in claim 2, wherein the control modulator is connected to an input of the wavelength controller to drive the wavelength controller and control the modulation of the radiation of the corresponding laser source.

7. An apparatus as claimed in claim 2, wherein each wavelength controller is connected to each corresponding demodulator to receive feedback signals from each corresponding demodulator to control the selected wavelength of the corresponding laser source.

8. An apparatus as claimed in claim 7, including at least one low-pass filter connected to the demodulators and the wavelength controllers to receive respective output signals from the demodulators, and configured to select a low frequency range of the demodulator output signals as the output signals pass through the low-pass filter to generate the feedback signals for the wavelength controllers.

9. An apparatus as claimed in claim 7, wherein the feedback signals include negative feedback signals for adjusting the selected wavelengths of the laser sources to match the centre wavelengths of the respective corresponding interferometers.

10. An apparatus as claimed in claim 1, including a single optical fibre, and a multiplexer for combining the radiation from the plurality of laser sources into the single optical fibre, wherein the plurality of interferometers are distributed along said optical fibre.

11. An apparatus as claimed in claim 10, wherein a distance between successive interferometers is about $cj/(4\,n\,F_{mod})$, where c is the speed of light, $F_{mod}$ is the modulation frequency, j is an integer, and n is the refractive index of the optical fibre.

12. An apparatus as claimed in claim 1, including the control modulator generating a shared signal for frequency or phase modulating the radiation from the plurality of laser sources at the same modulation frequency.

13. An apparatus as claimed in claim 1, wherein the at least one control modulator includes a plurality of control modulators connected to respective laser sources, wherein the control modulators generate signals that modulate the radiation from the laser sources at respective different modulation frequencies.

14. An apparatus as claimed in claim 13, including a shared optical detector, configured to receive a plurality of the reflected or transmitted optical output signals for generating a shared detected signal such that each demodulator demodulates the shared detected signal to produce the respective measurement signals.

* * * * *